(12) United States Patent
Yaniv et al.

(10) Patent No.: US 6,580,225 B2
(45) Date of Patent: Jun. 17, 2003

(54) COLD CATHODE

(75) Inventors: Zvi Yaniv, Austin, TX (US); Richard Lee Fink, Austin, TX (US); Zhidan Li Tolt, San Jose, CA (US)

(73) Assignee: SI Diamond Technology, Inc., Austin, TX (US)

( * ) Notice: Subject to any disclaimer, the term of this patent is extended or adjusted under 35 U.S.C. 154(b) by 0 days.

(21) Appl. No.: 10/062,037

(22) Filed: May 31, 2002

(65) Prior Publication Data

US 2002/0135311 A1 Sep. 26, 2002

Related U.S. Application Data

(60) Division of application No. 09/453,304, filed on Dec. 2, 1999, now Pat. No. 6,479,939, which is a continuation-in-part of application No. 09/174,500, filed on Oct. 16, 1998, now Pat. No. 6,181,056.

(51) Int. Cl.$^7$ ................................................. G09G 3/10
(52) U.S. Cl. ........................ 315/169.3; 315/169.1; 313/309; 313/310; 313/336
(58) Field of Search ..................... 315/169.1, 169.3; 313/310, 309, 336, 351, 333, 495

(56) References Cited

U.S. PATENT DOCUMENTS

| | | | | |
|---|---|---|---|---|
| 5,369,290 A | * | 11/1994 | Kawasaki et al. | 257/103 |
| 5,536,193 A | * | 7/1996 | Kumar | 445/50 |
| 5,945,777 A | * | 8/1999 | Janning et al. | 313/310 |
| 6,008,595 A | * | 12/1999 | Fink et al. | 315/308 |
| 6,097,139 A | * | 8/2000 | Tuck et al. | 313/310 |

\* cited by examiner

*Primary Examiner*—Haissa Philogene
(74) *Attorney, Agent, or Firm*—Kelly K. Kordzik; Winstead Sechrest & Minick P.C.

(57) ABSTRACT

A carbon film having an area of insulating material surrounded by an area of conducing material, and an area of material between the area of insulating material and the area of conducting material having a graded dielectric constant which varies from high to low from the area of insulating material to the area of conducting material.

7 Claims, 5 Drawing Sheets

COLD CATHODE

CROSS REFERENCE TO RELATED APPLICATION

This is a division of application Ser. No. 09/453,304 filed Dec. 2, 1999 now U.S. Pat. No. 6,479,939, which is a CIP of Ser. No. 09/174,500 filed Oct. 16, 1998 now U.S. Pat. No. 6,181,856.

TECHNICAL FIELD

The present invention relates in general to field emission devices, and in particular, to a cold cathode for use as a field emitter.

BACKGROUND INFORMATION

Cold cathodes are materials or structures that emit electrons with the application of electric fields without heating the emitter significantly above room temperature. Examples of cold cathodes are small metal tips with sharp points that are fabricated together with a grid structure around the tips such that an appropriate bias placed between the grid structure and the tips will extract electrons from the tips when operated in a suitable vacuum environment (Spindt emitters).

Diamond, diamond-like carbon (DLC) and other forms of carbon films have also been investigated for use as cold cathode electron emitters for many applications, such as flat panel displays, microwave device applications, backlights for liquid crystal displays (LCDs), etc. Many different techniques for growing the carbon films were tried resulting in a wide variety of carbon films. The mechanism for electron emission from these carbon films is not clear and is the subject of much investigation. What has been found consistently is that electrons are not emitted uniformly from the carbon cold cathodes, but are instead emitted from specific areas or sites of the carbon film. These areas are the emission sites (ES). The density of these sites in a unit area is referred to as the emission site density (ESD).

Researchers recognized early on that the negative electron affinity of the hydrogen terminated <111> and <100> faces of diamond may be important. A material having negative electron affinity (NEA) means that if an electron is in the conduction bands of the material, this electron has no barrier to prevent it from leaving the material if the electron diffuses to the surface having the NEA property.

The question for diamond has always been how to get an electron into the conduction band of diamond. This is not an easy question since diamond is an insulator with a very wide energy gap (5.5 eV) between the conduction band and the valence band. For an insulator at room temperature with this large a band gap, the population of electrons in the conduction band is too small to support any substantial emission current. Researchers have speculated that the electrons are injected into the diamond from a back side contact.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
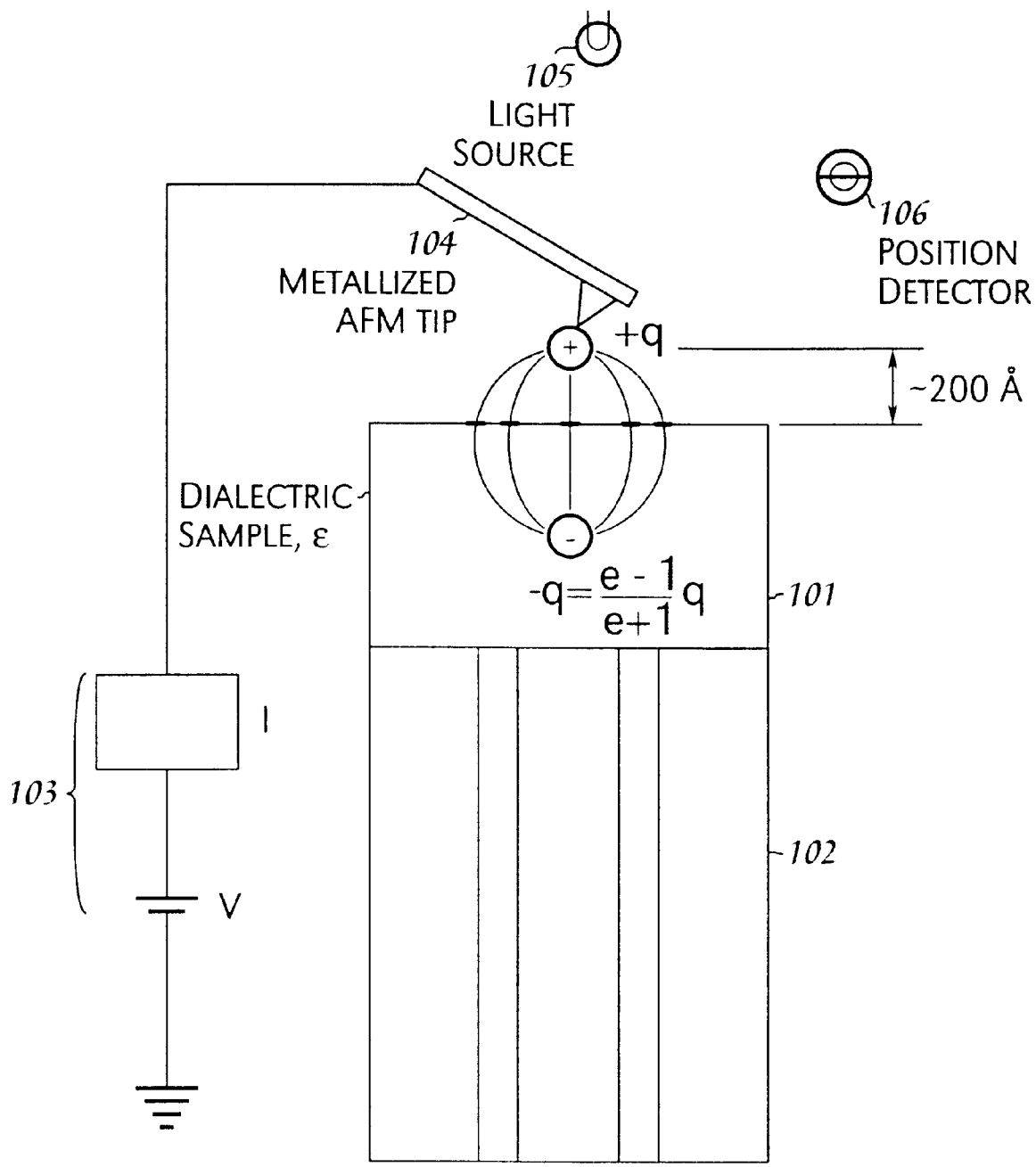
FIG. 1 illustrates an apparatus for measuring the dielectric constant of a material.

In the following description, numerous specific details are set forth such as specific emitter types, etc. to provide a thorough understanding of the present invention However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

As disclosed in Ser. No. 09/174,500, the inventor produced films for testing to characterize emission sites at better than 100 nm spatial resolution using a modified atomic force microscope (AFM).

Referring to FIG. 1, a modified scanning microscope was operated in two modes. In the first mode the tip 104 was placed touching the surface of the sample 101 (mounted on sample holder 102) and scanned across the surface 101 to measure the physical topography (AFM mode). The height of the tip 104 was detected by bouncing a light beam from light source 105 off of the end of the tip 104 and reflected into a position detector 106. The position of the light hitting the detector 106 is dependent on the height of the needle tip 104. In another mode (scanning polarization force microscopy (SPFM) mode), the tip 104 was placed about 100 nm away from the surface as shown in FIG. 1. A voltage bias from source 103 was placed on the needle tip 104 while the tip 104 was scanned across the surface. By biasing the tip 104, an electric charge was placed on the tip 104 relative to the surface. The material reacted to the charge on the tip 104 by placing charges on the surface in such a way as to form what appears to be an image charge inside the material 101. The strength of the image charge is dependent on the dielectric constant (∈) of the material 101 as given by the equation $$-q'=q*(\in-1)/(\in+1)$$

Here q' is the magnitude of the image charge and q is the charge placed on the tip 104. Since the image charge is of opposite polarity to the charge on the tip 104, an attractive force develops between the needle tip 104 and the surface of the substrate 101. This force deflects the needle 104. The magnitude of the force is detected by the position of the light hitting the detector 106. By scanning the needle tip 104 across the surface, a mapping of the relative dielectric constant across the surface is obtained. Simultaneously, if the bias on the tip 104 is high enough, electrons from the carbon film 101 can be field emitted from the surface of the sample 101 to the tip 104. By monitoring the current to the tip 104, the emission sites of the carbon film 101 can be located. Thus this instrument can map simultaneously the spatial emission properties of the sample 101 and the dielectric properties of the material 101, allowing a correlation of the results.

Figure 2:
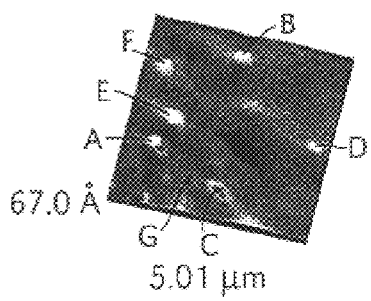
FIG. 2 illustrates results of one area of a carbon film showing the dielectric properties and the field emission properties.

FIG. 2 shows the results of one area of the carbon film 101 showing both the dielectric properties (left side image) and the field emission properties (right side image). What was discovered was that the field emission sites are correlated with specific dielectric properties of the sample 101. The features that are correlated to the emission sites are characterized by a dark area surrounded by a ring of bright area. They look like small volcanoes. Examples of these are features labeled A, B, and C. The emission sites are actually centered on the dark part of the volcano features. This corresponds to an area of material having a relatively low dielectric constant surrounded by a ring of material 101 having a relatively higher dielectric constant. Classically, the dielectric constant is related to the conductivity of the material. We correlate the areas of relatively high dielectric constant to material that is more conductive. We correlate the areas of relatively low dielectric strength to material that is more insulating. Since the film was grown by a diamond CVD process, we concluded that the insulating material was diamond and that the conductive ring was amorphous or graphitic carbon.

We also noted that the dielectric distribution going towards the center of these volcanoes was not abrupt but instead was gradual until it reached the dark center of the volcano. This suggests that the dielectric constant of the material 101 varies gradually towards the center of the volcano feature. In other words, the material surrounding the diamond has a graded dielectric constant, the interfaces are not abrupt, but gradual. One of the emission sites (site A) has the volcano feature as well as a well defined area of high dielectric constant next to it.

We also noted that there are other features in the dielectric map that do not correspond to emission sites Two features marked E and F do not have the dark centers of the volcano features. Another volcano-like feature (labeled G) is not correlated with an emission site. Note that this feature also is not surrounded by a significant conducting ring as the other features A, B, C.

Finally we noted that the intensity of emission from different sites was not uniform. The site marked D has the smallest emission intensity of the sites that emit. Its volcano features are hardly discernible.

Thus we discovered that a certain structure promotes electron field emission from the diamond films. These structures consist of a small diamond particle (less than 2000Å in diameter) surrounded by a material that has a dielectric constant that changes gradually in a volcano-like structure. It is believed this structure is necessary to promote injection of electrons into the low dielectric material which is presumably diamond. Once in the diamond conduction band, these electrons have little or no barrier for emission because of the low or negative electron affinity of the diamond surfaces.

Figures 4, 6:
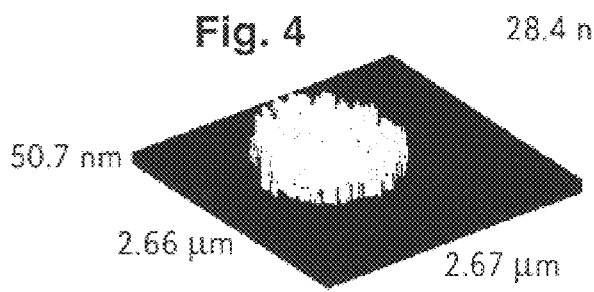
FIG. 4 illustrates a digital image of a single site emission current image.
FIG. 6 illustrates a digital image of a non-contact topography image of an emission site showing "grainy" distribution of physical parameters.
Figure 5:
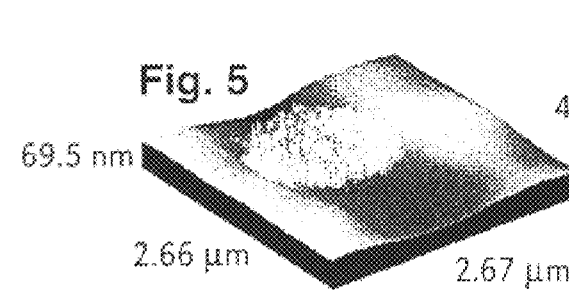
FIG. 5 illustrates a digital image of the topography of a single emission site taken simultaneously with the emission current image of the same site as illustrated in FIG. 4.

The inventors have since performed additional tests on samples and have arrived at new discoveries. FIG. 4 illustrates an image of emission current of a single emission site measured using the SPFM mode with a tip bias of +9.33 volts and a separation of 100 nm. FIG. 5 illustrates the same single emission site illustrating a distinct SPFM topography image matching the same geometrical area of the emission current image in FIG. 4. The correlation is similar to what was explained for FIG. 2, emission properties and dielectric properties are both imaged together over the same area of the sample.

Figure 7:
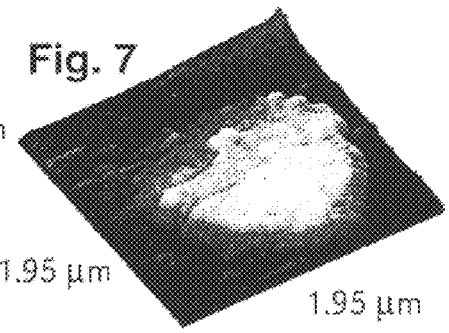
FIG. 7 illustrates a digital image of a contact topography of the single site illustrated in FIG. 6 showing a structure of "bumps"

FIG. 7 illustrates a digital image showing the topography of a single emission site using the AFM mode, which illustrates a "grainy" structure of "bumps" of approximately 50–100 nm. FIG. 6 illustrates a topography image using the SPFM mode of the same emission site, which also shows a "grainy" distribution of physical parameters, which correlate to the "grainy bumps" from the AFM image in FIG. 7. The noise spikes within the FIG. 6 image are to be ignored.

When searching for these emission sites, an area of the sample measuring approximately 6 micrometers×6 micrometers was searched. In general, it took about three such general scans to locate an emission site. A conclusion from the foregoing is that the emission site density is equivalent to one site per one hundred square micrometers or one million emission sites per square centimeter.

Figure 8:
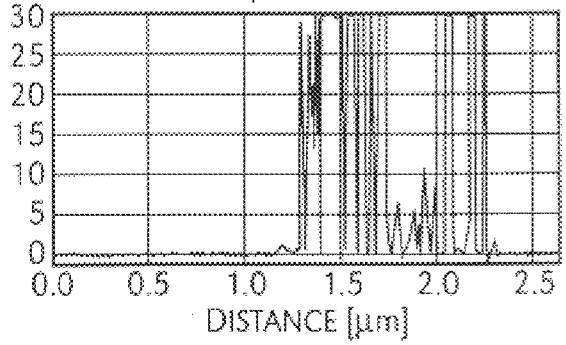
FIG. 8 illustrates a cross-section of emission current data from a single emission site illustrating emission time dependence.
Figure 9:
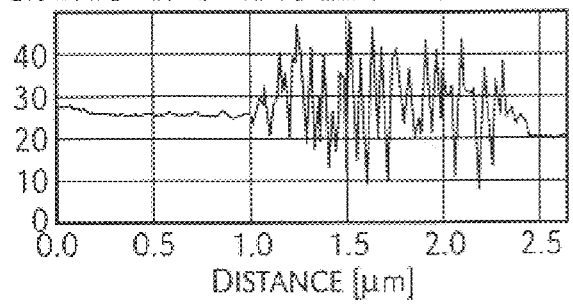
FIG. 9 illustrates a cross-section of fluctuations of a topographic image of a single emission site whose current image is illustrated in FIG. 8.
Figure 3:
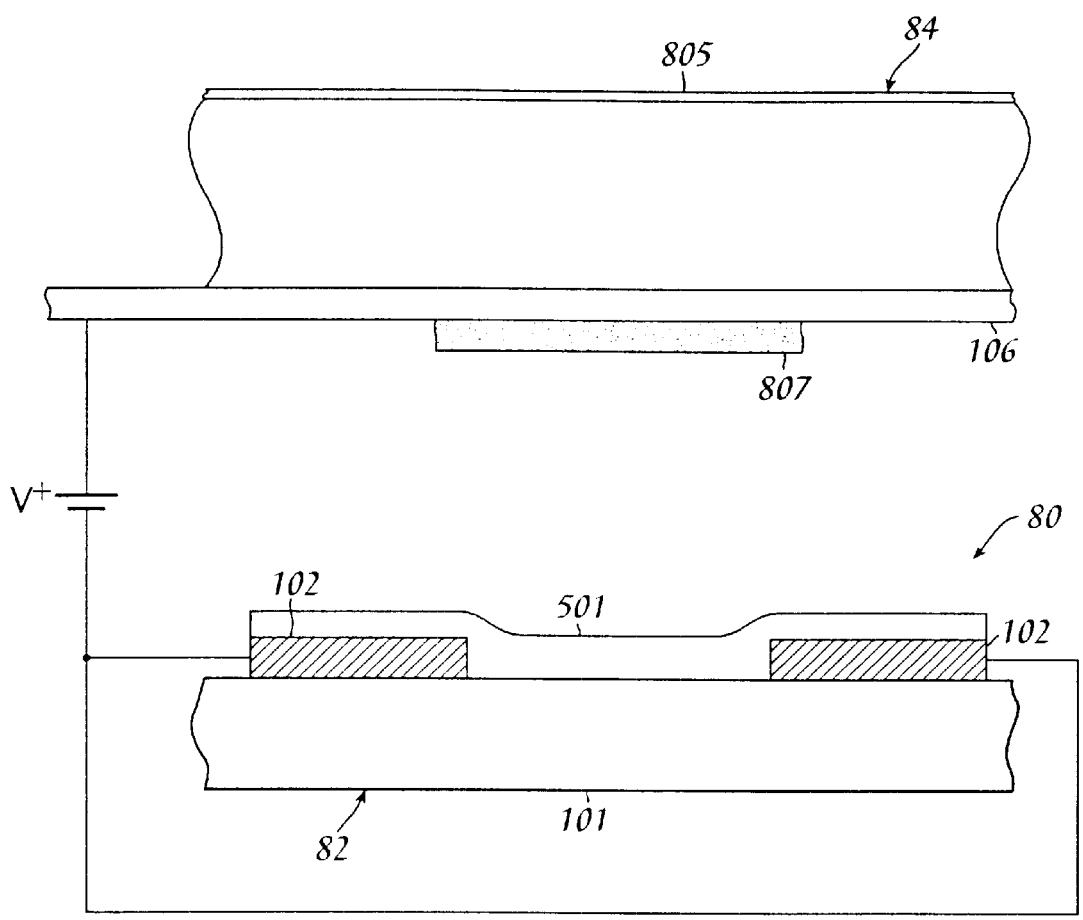

Referring to FIG. 8, it has also been discovered by viewing the cross-section of the emission current data from a single emission site that the emission is time-dependent with a lateral resolution of 50 nm. The cross-section of the image data in FIG. 8 was taken using the SPFM mode. There are two items to note in this scan: (a) the image does not repeat itself on consecutive scans, and (b) the feature sizes along the length scale are sharper than what is expected given the resolution of the measurement in SPFM mode. FIG. 9 illustrates the simultaneous topographic image in SPFM mode of such a single site The features in this scan also do not repeat in consecutive scans and are also sharper than expected given the resolution of the instrument in this mode. The area of sharp features in FIG. 8 is correlated with the area of sharp features in FIG. 9. These two figures show that the emission current is changing with time and the surface potential due to surface charging is also changing with time.

Figure 10:
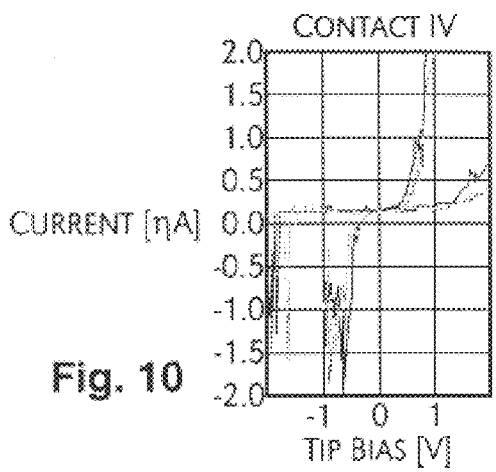
FIGS. 10–12 illustrate graphs of wide variations in conductivity of non-emitting regions of a carbon film.
Figure 11:
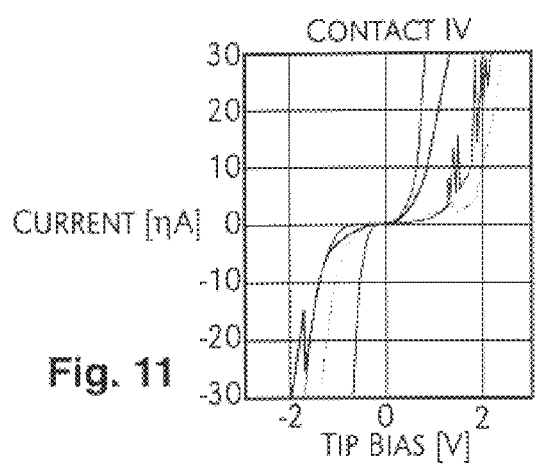
Figure 12:
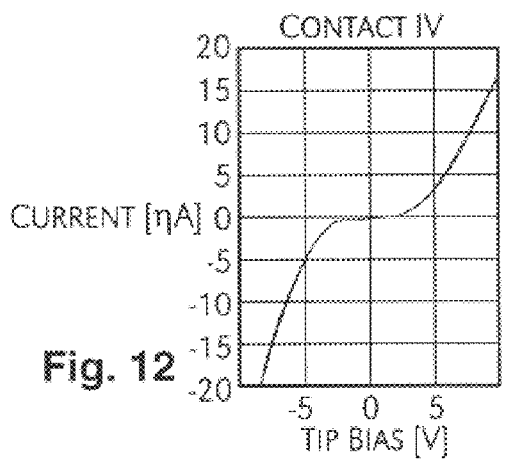
Figure 15:
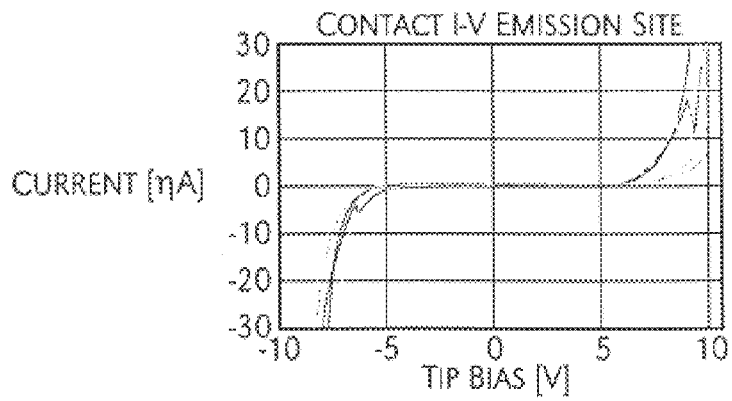
FIG. 15 illustrates a graph of semiconductor-type behavior of an emission site of a film in accordance with the present invention.

FIGS. 10–12 show that non-emitting regions of a sample do not show semiconductor interface behavior, but instead a wide variation in conductivity from a perfect insulator to nearly ohmic behavior. FIG. 15, however, illustrates a contact I–V spectra of an emission site, which shows a semiconductor type behavior with a relatively large band gap.

Figure 14:
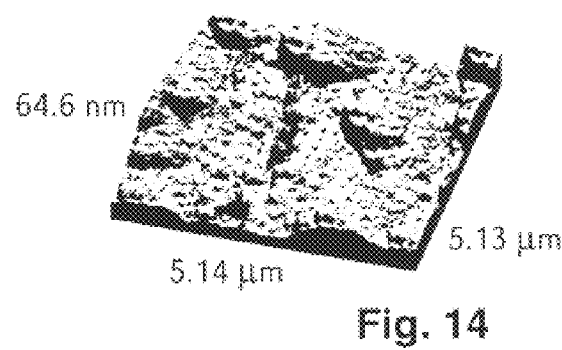
FIG. 14 illustrates a digital image of a portion of the emitting film as graphed in FIG. 13.
Figure 13:
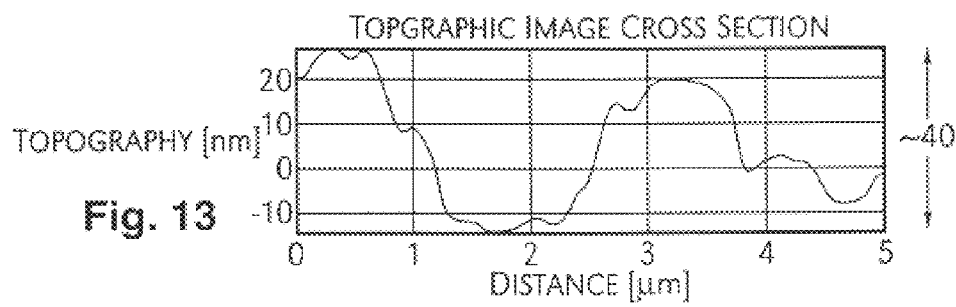
FIG. 13 illustrates a topographic image cross-section of an emitting carbon film.

FIGS. 13 and 14 illustrate that there is typically no geometric enhancement at the vacuum/film interface. The image in FIG. 14 and the graph in FIG. 13 were taken using a contact AFM mode with a +6 volt biased tip.

Some conclusions can now be made. The emission sites are formed of geometric grainy bumps. However, such emission sites do not have microtips, but are very relatively flat. The sharpest features have a rise of ~±20 nm over a distance of ~1.0 nm (~1000 nm). This corresponds to an enhancement of 2°% or less, which is very flat compared to microtip cathodes. A location that emits exhibits a semiconductor behavior with a wide band gap. Furthermore, the gradient portion described previously with respect to FIG. 2 is time-dependent so that nonactive sites, such as sites E and F become active at a later time, and the active sites, A, B, and C, will become inactive. Furthermore, such periods of activity and inactivity may be coupled and may oscillate, as the transitional intermittent interfaces between the grainy bumps behave as semiconductors whereby a charge builds up and is then emitted as electrons, resulting in an emission site. Subsequently the interface between the bumps loses the charge and must again charge up to a threshold limit. During the charge up period, the emission site is inactive. For further discussion, refer to J. Robertson, "Mechanism of Electron Field Emission From Diamond and Diamond-Like Carbon," IVMC 98, pp. 162–163, which is hereby incorporated by reference herein.

The areas of grainy bumps may be areas of carbon growth on the surface of the substrate. It is known by scanning electron microscope images that the carbon film is not continuous across the surface of the sample. The grains within the bump may be grains of diamond plus grains of graphite in an amorphous carbon matrix.

Please note that the carbon emitter of the present invention may comprise any known carbon-based field emission device, including carbon films, microtip structures, and carbon nanotubes.

Figure 3:
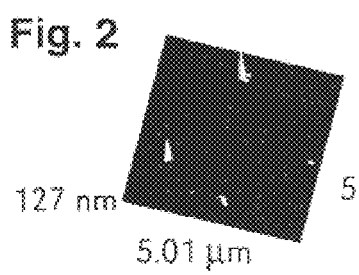
FIG. 3 illustrates a field emitter device configured in accordance with the present invention.

Referring next to FIG. 3, there is illustrated field emitter device 80 configured with a film produced in accordance with the invention discovered above. Device 80 could be utilized as a pixel within a display device, such as within display 938 described below with respect to FIG. 16.

Device 80 also includes anode 84, which may comprise any well-known structure. Illustrated is anode 84 having a substrate 805, with a conductive strip 806 deposited thereon. Then, phosphor layer 807 is placed upon conductive film 806. An electrical potential V+ is applied between anode 84 and cathode 82 as shown to produce an electric field, which will cause electrons to emit from film 501 towards phosphor layer 807, which will result in the production of photons through glass substrate 805. Note that an alternative embodiment might include a conductive layer deposited between film 501 and substrate 101. A further alternative embodiment may include one or more gate electrodes (not shown).

Figure 16:
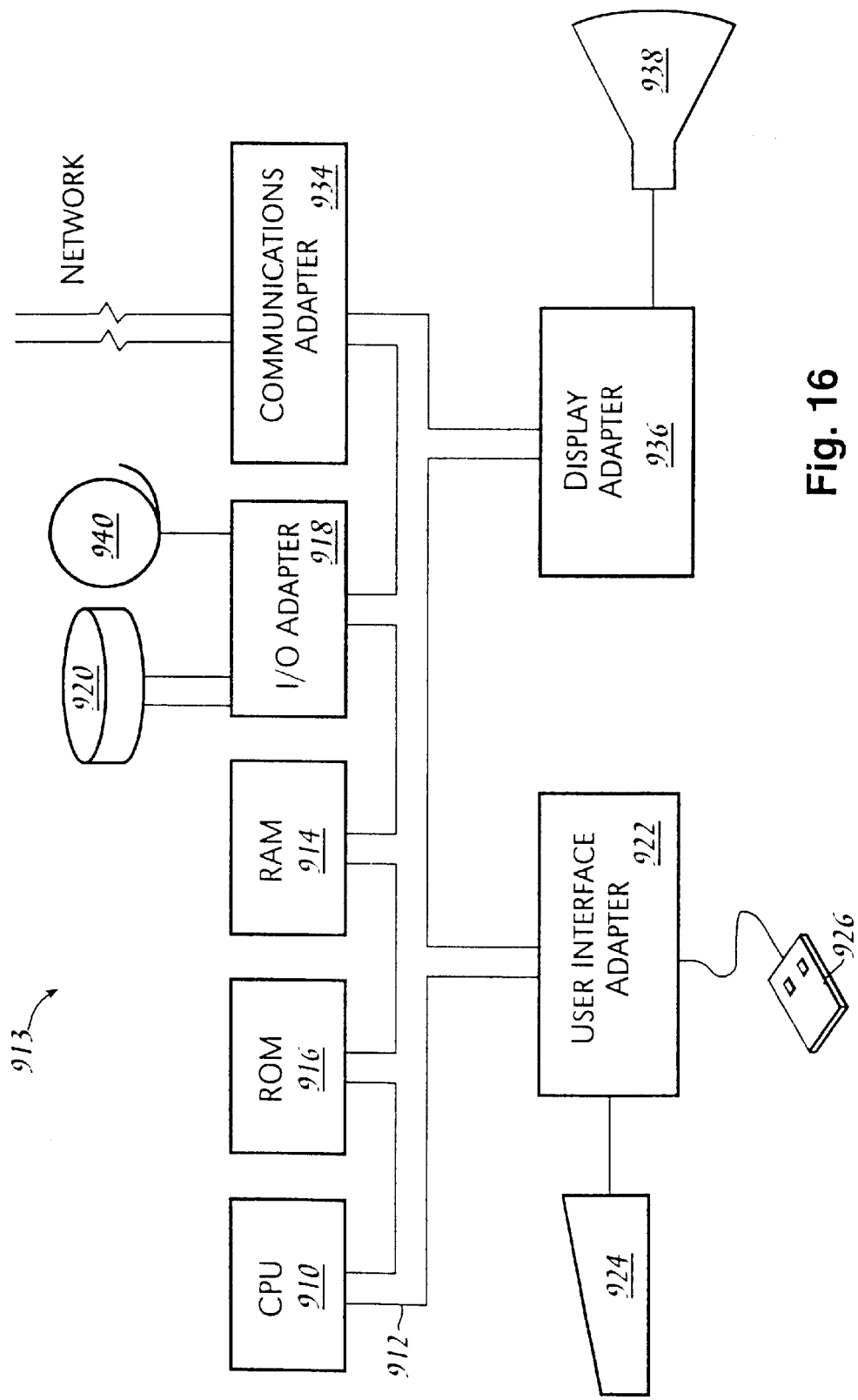
FIG. 16 illustrates a data processing system configured in accordance with the present invention.

As noted above, field emitter device 80 may be utilized within field emission display 938 illustrated in FIG. 16. A representative hardware environment for practicing the present invention is depicted in FIG. 16, which illustrates a typical hardware configuration of workstation 913 in accordance with the subject invention having central processing unit (CPU) 910, such as a conventional microprocessor, and a number of other units interconnected via system bus 912. Workstation 913 includes random access memory (RAM) 914, read only memory (ROM) 916, and input/output (I/O) adapter 918 for connecting peripheral devices such as disk units 920 and tape drives 940 to bus 912, user interface adapter 922 for connecting keyboard 924, mouse 926, speaker 928, microphone 932, and/or other user interface devices such as a touch screen device (not shown) to bus 912, communication adapter 934 for connecting workstation 913 to a data processing network, and display adapter 936 for connecting bus 912 to display device 938. CPU 910 may include other circuitry not shown herein, which will include circuitry commonly found within a microprocessor, e.g., execution unit, bus interface unit, arithmetic logic unit, etc. CPU 910 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A method of operating a field emission device, comprising the steps of:

providing an emitter deposited on a substrate; and applying an electric field to the emitter to thereby cause an emission of electrons from an emission site comprising grains of conducting and non-conducting material, wherein the emission from the emission site is time dependent.

2. The method as recited in claim 1, wherein the emitter is a carbon emitter.

3. The method as recited in claim 1, wherein material in the emission site exhibits a wide band gap.

4. A method of operating a field emission device, comprising the steps of:

providing an emitter deposited on a substrate; and applying an electric field to the emitter to thereby cause an emission of electrons from an emission site comprising grains of conducting and non-conducting material, wherein the emission from the emission site is intermittent.

5. A method of operating a field emission device, comprising the steps of:

providing an emitter deposited on a substrate; and applying an electric field to the emitter to thereby cause an emission of electrons from an emission site comprising grains of conducting and non-conducting material, wherein the emission site is surrounded by non-emitting regions having a wide variation in conductivity from insulative to nearly ohmic.

6. A method of operating a field emission device, comprising the steps of:

providing an emitter deposited on a substrate; and applying an electric field to the emitter to thereby cause an emission of electrons from an emission site comprising grains of conducting and non-conducting material, wherein the emission site appears as a conglomerate of grains as shown on an AFM image on a scale of 1 micrometer×1 micrometer or larger.

7. A method of operating a field emission device comprising the steps of providing a carbon emitter on a substrate, wherein the carbon emitter includes a first emission site having a plurality of bumps with interfaces therebetween, and a second emission site having a plurality of bumps with interfaces therebetween; and applying an electric field to the carbon emitter to thereby cause an emission of electrons from the first emission site, wherein the application of the electric field to the carbon emitter results in emission of electrons from the second emission site a time period after electron emission from the first emission site, wherein the first emission site is not emitting electrons while the second emission site is emitting electrons.

* * * * *